United States Patent
Ho et al.

(10) Patent No.: US 6,953,393 B2
(45) Date of Patent: Oct. 11, 2005

(54) APPARATUS FOR REMOVING BURRS FROM A COMPACT DISC

(75) Inventors: Wu Hsuan Ho, Hsinchu (TW); Chun Ping Wang, Hsinchu (TW); Shih Hsiang Chou, Hsinchu (TW)

(73) Assignee: Optodisc Technology Corporation, Hsinchu (TW)

( * ) Notice: Subject to any disclaimer, the term of this patent is extended or adjusted under 35 U.S.C. 154(b) by 0 days.

(21) Appl. No.: 10/739,160

(22) Filed: Dec. 19, 2003

(65) Prior Publication Data

US 2005/0136810 A1 Jun. 23, 2005

(51) Int. Cl.[7] .................................................. B24B 7/22
(52) U.S. Cl. ............................ 451/67; 451/68; 100/214
(58) Field of Search ..................... 451/67, 68, 285–290; 100/214

(56) References Cited

U.S. PATENT DOCUMENTS 6,106,375 A * 8/2000 Furusawa ..................... 451/67
6,257,966 B1 * 7/2001 Ishikawa et al. ............. 451/67

FOREIGN PATENT DOCUMENTS

JP          410235434 A  *  9/1998  ........... B21D/28/00

* cited by examiner

*Primary Examiner*—Lee D. Wilson
*Assistant Examiner*—Anthony Ojini
(74) *Attorney, Agent, or Firm*—Rosenberg, Klein & Lee

(57) ABSTRACT

The present invention discloses a burr removing apparatus including a base for placing the compact disc on, and a pressing apparatus equipped on the base and corresponding to the inner circle of the compact disc for moving up and down to eliminate a bur at the inner circle of the compact disc. An upper and a lower inhaling apparatus are respectively equipped in the pressing apparatus and the base, and extend respectively to the surfaces of the pressing apparatus and the base. The upper and lower inhaling apparatus have the upper and lower inhaling holes to inhale the bur eliminated. The present invention eliminates and inhales the redundancy before bonding the discs, so the smoothness of the disc can be improved to avoid the bubbles while bonding, and providing a disc with good mechanical properties and weather-resistance.

9 Claims, 3 Drawing Sheets

APPARATUS FOR REMOVING BURRS FROM A COMPACT DISC

BACKGROUND OF INVENTION

1. Field of the Invention

The invention relates to an apparatus for removing burrs from a compact disc, and more particularly, to a burr removing apparatus applied to a bonding apparatus of a compact disc.

2. Description of the Prior Art

As the development of the digital multimedia, the 650 MB CD-ROM that can store the audio and video data in 74 minutes is insufficient for the requirement of the video quality and the capacity. The digital versatile disk (DVD) is developed to satisfy the large capacity required by the high quality video and the digital AV multimedia.

For providing the DVD disc with a compatible property to the CD disc, the DVD disc has a 12 cm diameter and is constructed with two 0.6 mm substrates, so the bonding technology is one of the most important DVD processes. However, please refer to FIG. 1, the disc substrate 10 is made with the injection molding method, and the bur or the un-smoothness is formed at the different-height position of the inner circle of the disc substrate 10 as marked in FIG. 1. The bur or the un-smoothness at the surface of the disc substrate 10 will lead to the incomplete bonding of two disc substrates 10, and producing the bubbles at the inner circle of the DVD disc after bonding. The bubbles will affect not only the appearance of the disc but also the mechanical properties and the weather-resistance. Hence, the present invention discloses a burr removing apparatus to solve the above-mentioned problems.

SUMMARY OF INVENTION

It is therefore a primary objective of the claimed invention to provide a burr removing apparatus that can improve the bonding apparatus to eliminate the redundancy of the disc before bonding and inhale the redundancy of the disc, and a smooth and clean disc can be obtained.

It is therefore another objective of the claimed invention to provide a burr removing apparatus that can remove the bubbles after bonding. The burr removing apparatus can improve not only the appearance of the disc but also the mechanical properties and the weather-resistance.

According to the claimed invention, the burr removing apparatus includes a base for locating the compact disc, and a pressing apparatus equipped above the base and corresponding to the inner circle of the compact disc for moving up and down to eliminate a bur at the inner circle of the compact disc. An upper and a lower inhaling apparatus are respectively equipped in the pressing apparatus and the base, and extend respectively to the surfaces of the pressing apparatus and the base. The upper and lower inhaling apparatus have the upper and lower inhaling holes to inhale the bur eliminated.

These and other objectives of the present invention will no doubt become obvious to those of ordinary skill in the art after reading the following detailed description of the preferred embodiment that is illustrated in the various figures and drawings.

DETAILED DESCRIPTION

The burs are generally formed at the different-height position of the inner circle of the disc made with the injection molding method. The claimed burr removing apparatus of the compact disc is used for burr removing before gluing and bonding, and having a particle inhaling apparatus to reduce the pollution of particles.

Figure 1:
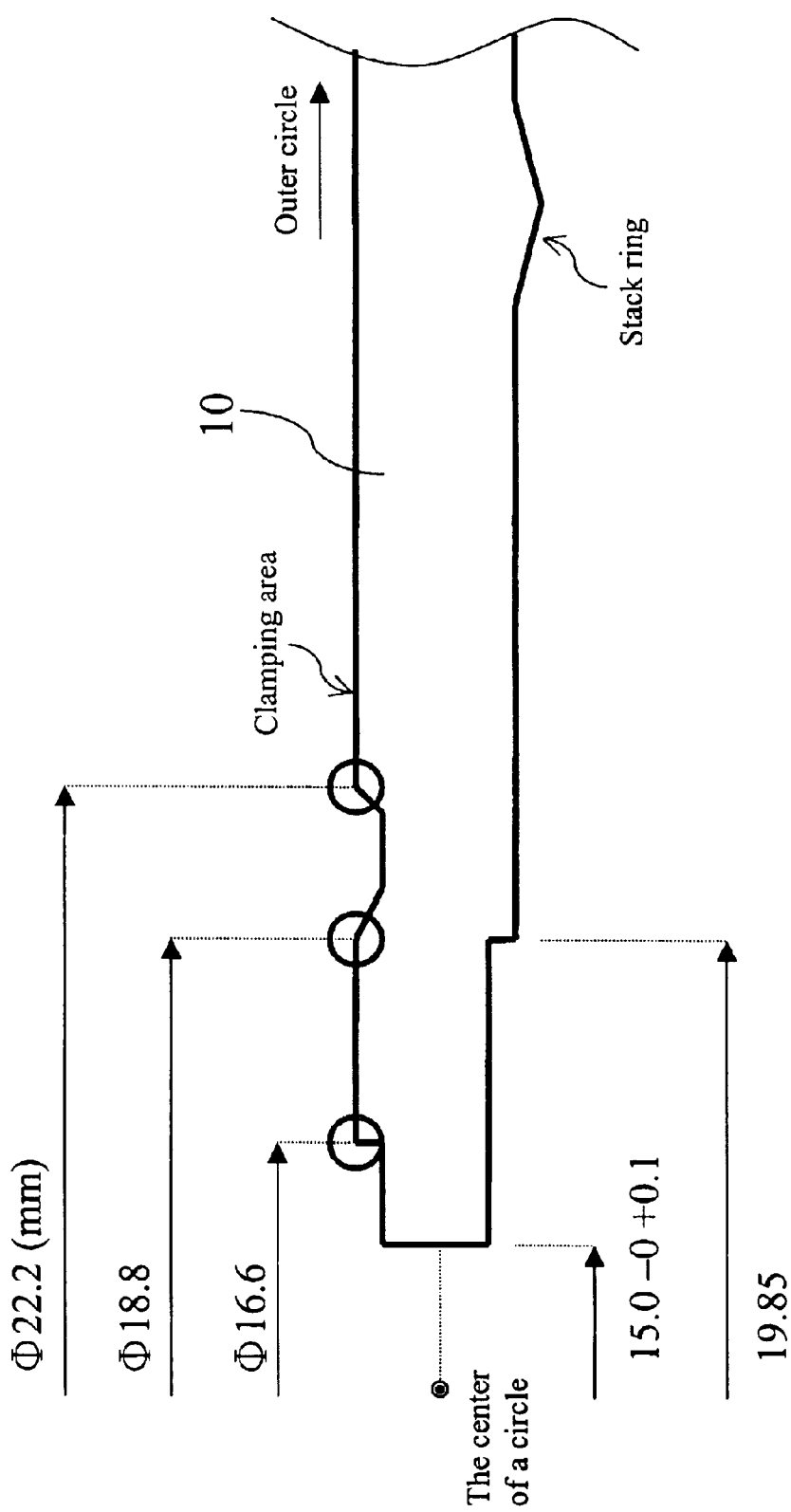
FIG. 1 is a schematic diagram of a conventional disc made with the injection molding method having the burs.
Figure 2:
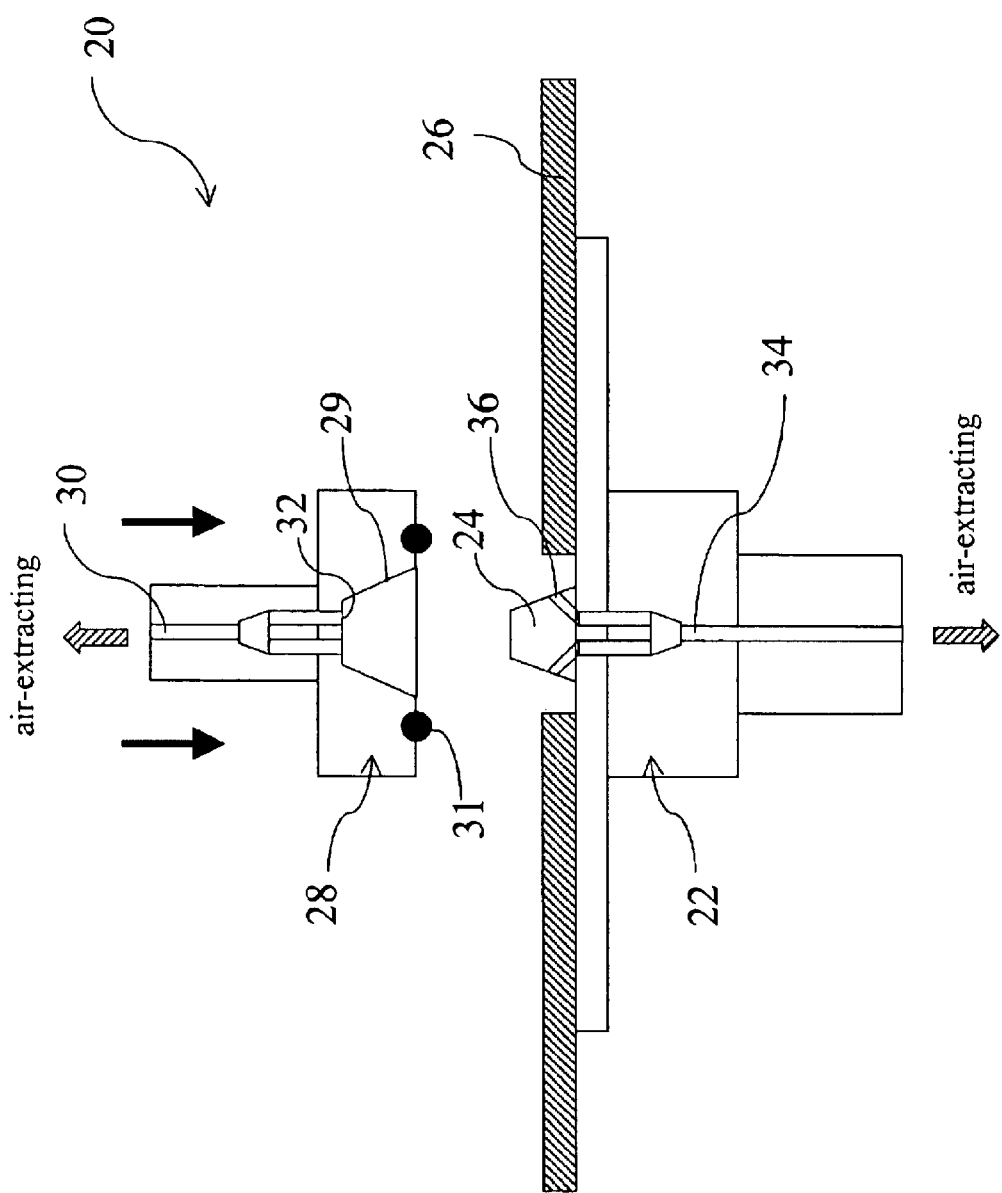
FIG. 2 is a structural diagram of the present invention.

Please refer to FIG. 2, which is a structural diagram of the present invention. A burr removing apparatus 20 includes a base 22 and a cone bulge 24 is equipped at the center of the upper surface of the base 22 to provide a compact disc 26 to pass through with its hollow region and locate on the base 22. Furthermore, a pressing apparatus 28 is equipped above the base 22 and corresponds to the inner circle of the compact disc 26, and a fillister 29 is equipped at the lower surface of the pressing apparatus 28 corresponding to the bulge 24. A gasket 31 is located around the fillister 29 on the lower surface of the pressing apparatus 28. The pressing apparatus 28 can move up and down to eliminate the burs at the inner circle of the compact disc 26. The gasket 31 buffers the compact disc 26 from be damaged while pressing.

Wherein, an upper inhaling apparatus 30 is equipped in the pressing apparatus 28 and are generally tubular. The upper inhaling apparatus 30 extends to the bottom of the fillister 29, and an upper inhaling hole 32 is equipped to show up to the pressing apparatus 28. Oppositely, a lower inhaling apparatus 34 is equipped in the base 22 and corresponds to the inner circle of the compact disc 26, and are generally tubular, too. The lower inhaling apparatus 34 extends to the side of the bulge 24, and a lower inhaling hole 36 is equipped to show up to the base 22.

When operating the burr removing apparatus 20, the pressing apparatus 28, the upper inhaling apparatus 30 and the lower inhaling apparatus 34 are turned on simultaneously. The pressing apparatus 28 presses down several times to eliminate the burrs of the compact disc 26 on the base 22 by crushing the burrs. At the same time, the upper and lower inhaling apparatus 30, 34 inhale the particles to keep the surface of the compact disc 26 smooth and reduce the pollution of the particles.

Figure 3:
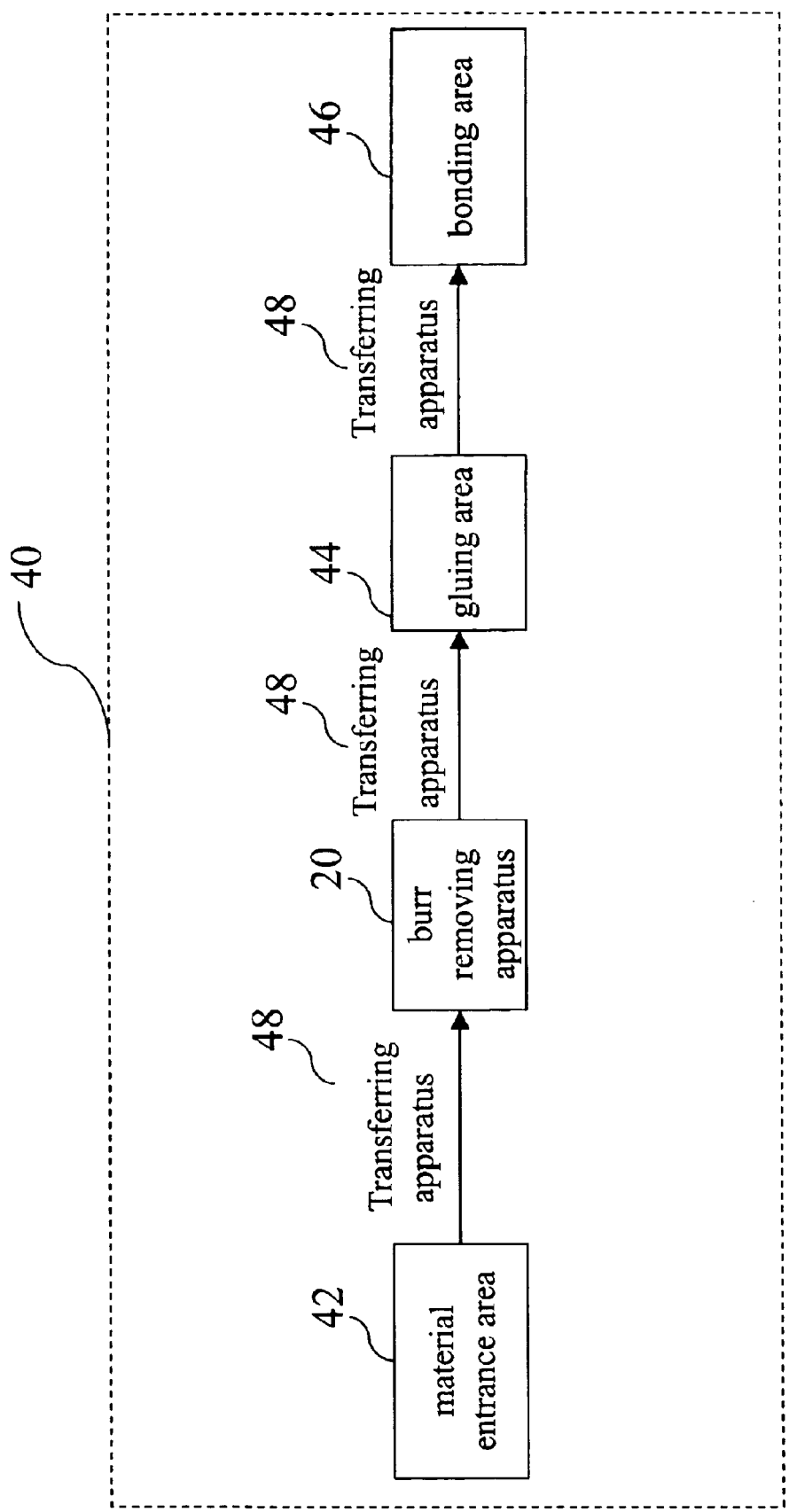
FIG. 3 is a block diagram of a disc bonding apparatus utilizing the present invention.

Please further refer to FIG. 3, which is a block diagram of a disc bonding apparatus utilizing the present invention. A disc bonding apparatus 40 has a material entrance area 42, a gluing area 44 and a bonding area 46, and a transferring apparatus 48 is utilized to transfer the semi-products between the areas. The burr removing apparatus 20 is equipped with a transferring apparatus 48 that is a robot, between the material entrance area 42 and the gluing area 44 for transferring the compact disc 26 to the gluing area 44 after burr removing to perform the gluing process. Then, the compact disc 26 is transferred to the bonding area 46 to perform the bonding process of two compact discs 26.

Hence, the inhaling apparatus are respectively equipped in the pressing apparatus and the base. The pressing apparatus can eliminate the redundancy and simultaneously, the inhaling apparatus can inhale the redundancy to provide a smooth disc for bonding. The present invention can avoid the problem of the burs and the disadvantage of bubbles at the inner circle of the DVD discs, and providing a DVD disc with great appearance, mechanical properties and weather-resistance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An apparatus for removing burrs from an inner circle of a compact disc, the apparatus comprising:
   a base for placing the compact disc on;
   a pressing apparatus equipped above the base and corresponding to the inner circle of the compact disc, the pressing apparatus being movable up and down to eliminate the burrs at the inner circle of the compact disc wherein the pressing apparatus eliminate the burrs by crushing the burrs;
   an upper inhaling apparatus equipped in the pressing apparatus and extending to a lower surface of the pressing apparatus, the upper inhaling apparatus has at least one upper inhaling hole to inhale a burr being eliminated; and
   a lower inhaling apparatus equipped in the base and corresponding to the inner circle of the compact disc, the lower inhaling apparatus extends to an upper surface of the base and has at least one lower inhaling hole to inhale a burr being eliminated.

2. The apparatus for removing burrs from a compact disc of claim 1 wherein a bulge is further equipped at the center of the upper surface of the base to provide a hollow region of the compact disc to pass through.

3. The apparatus for removing burrs from a compact disc of claim 2 wherein the lower inhaling apparatus extends to the surface of the bulge.

4. The apparatus for removing burrs from a compact disc of claim 1 wherein a fillister is equipped at the lower surface of the pressing apparatus.

5. The apparatus for removing burrs from a compact disc of claim 4 wherein the upper inhaling apparatus extends to the surface of the fillister.

6. The apparatus for removing burrs from a compact disc of claim 1 wherein the upper inhaling apparatus and the lower inhaling apparatus are tubular.

7. The apparatus for removing burrs from a compact disc of claim 1 wherein a gasket is further located around the lower surface of the pressing apparatus to act as a buffer for the compact disc.

8. The apparatus for removing burrs from a compact disc of claim 1 further including a transferring apparatus disposed between a material entrance area and a gluing area of a disc bonding apparatus for transferring the compact disc to the bonding area after being deburred.

9. The apparatus for removing burrs from a compact disc of claim 8 wherein the transferring apparatus is a robot.

* * * * *